Patented Dec. 10, 1940

2,224,723

UNITED STATES PATENT OFFICE 2,224,723

CONTACT INSECTICIDE FROM PETROLEUM

Carleton Ellis, Montclair, N. J., assignor to Standard Oil Development Company, a corporation of Delaware No Drawing. Application December 24, 1937, Serial No. 181,605

6 Claims. (Cl. 167—22)

This invention relates to the production of insecticidal materials from petroleum hydrocarbons. It is particularly applicable to the production of nitrated hydrocarbons and nitro-hydrazones. It comprises further the production and use of insecticidal substances which are relatively harmless to foliage of plants.

Furthermore, this invention proposes the use, as starting materials, of hydrocarbon fractions readily available from petroleum.

The present invention comprises the nitration of olefinic, saturated aliphatic, naphthenic, and aryl or aralkyl hydrocarbons, and the like. For this purpose any suitable nitrating agent (e. g. nitric acid, mixed nitric-sulphuric acids, oxides of nitrogen, etc.) may be employed. In this manner, nitrated hydrocarbons are obtained, said nitrated hydrocarbons being valuable as contact insecticides for use against various insect pests. This invention further proposes the condensation of said nitrated hydrocarbons with diazonium compounds whereby nitro-hydrazones of insecticidal value are obtained. Any amine which can be converted (e. g. by means of mineral acid-metallic nitrite, nitrogen trioxide, amyl nitrite, and the like) into a diazonium compound may be used for the purpose.

As is well known, many forms of vegetation, such as vegetables, fruits and flowers, are attacked and infested by various species of insects. Some of the more common of these are the various beetles (Japanese, Mexican Bean, etc.), the codling moth, the boll weevil, aphides, and red spiders. The first-mentioned of these, the beetle-type of insects, because of their hard and impervious shells, are usually eradicated by means of stomach poisons of the type lead-arsenate, etc., said materials being very poisonous to mammals and toxic to foliage as well. On the other hand, it has been found that the materials proposed by the present invention are effective in killing the soft-shell type of insect pest, for example, aphides and red spiders, by mere contact with these insects. It has been found further that this is accomplished without imparting deleterious effects to the foliage of plants and without endangering the health of persons employed in spraying vegetation.

Aphides or plant lice, as they are commonly known, may be either black (Chrysanthemum) or green in color. Although very small in size, they often do as much damage to vegetation as do larger insects. Under normal warm weather conditions they increase astoundingly fast, a single female aphis giving rise to a progeny of thousands. These insects remain fixed on the same spot with their beaks buried into the plants, sucking out the juices flowing to those portions. This constant irritation causes deformation or death of the plant. Aphides secrete a honey-like material which may finally cover the entire plant as a sticky, sweetist layer, thereby preventing respiration of the plant and attracting other insects. Certain fungi (Capnodium family) live exclusively on this waste and thereby likewise infest the plant, covering it with a smut disease known as Fumagine. The red spider (*Tetranychus telarius*), a red, polyphagous acarus, on the other hand, attacks many diverse plants, the leaves becoming prematurely discolored and dropping.

Insect pests of this type are generally combated by means of contact insecticides, which materials, on coming in contact with insects, are absorbed through the latter's shells, thereby causing paralysis of the nervous system or producing death in some other manner. One of the most widely used materials of this class is nicotine, an alkaloid obtained from tobacco. This plant serves as the only source of nicotine, which it furnishes by extraction or steam distillation. Since nicotine is found in tobacco in a very low concentration (4–6%), its recovery entails considerable expense.

In contrast to this, it has been found that powerful insecticides can be easily produced from by-product or low-grade petroleum hydrocarbon fractions. The treatment involved comprises nitrating said hydrocarbon mixtures with suitable nitrating agents and separating nitration products thus formed. I have found further that these nitrated hydrocarbons may be condensed with diazonium compounds to produce nitro-hydrazones, said nitro-hydrazones being effective as contact insecticides. I have found also that nitrated hydrocarbons or nitro-hydrazones prepared in this way may be effectively applied, as insecticides, either in the form of emulsions (e. g. in soap media) or dissolved in light hydrocarbon solvents (e. g. petroleum ether, kerosene, and the like), or mixed with suspensions of colloidal clays.

By soap media I mean water-soluble detergents and wetting agents comprising not only solutions of salts of fatty acids, but also salts of alkyl sulphuric acids (e. g. palmityl hydrogen sulphate), as well as salts of alkyl and aryl sulphonates, amine salts and the like.

By colloidal clays I include bentonite, fuller's earth, diatomaceous earth, or other material capable of dispersing the insecticidal materials.

By hydrocarbon solvents are included volatile petroleum fractions which evaporate readily, leaving the insecticidal material on the insect as residue.

In some cases the hydrocarbon starting material may be olefinic in nature. An example of this is the product, consisting essentially of octenes, which is obtained by the polymerization of isobutylene, or of isobutylene with normal butylene. This polymerization may be effected at elevated temperatures with the aid of activated clay, alumina, kieselguhr, and the like, or at lower temperatures using such catalysts as sulphuric or phosphoric acids, or aluminum chloride or boron trifluoride, etc. The polymerized olefins are of true olefinic nature, just as are the unpolymerized olefins, since both fractions contain unsaturated linkages (double-bonded carbon atoms which are lacking in hydrogen atoms and which may form derivatives by addition as well as by substitution). In such cases, the nitration treatment may result in the attachment of nitrated groups both at the point of unsaturation (by addition) and also at points of saturation (by substitution).

In other cases, as when working with Pennsylvania oils, the amount of unsaturated material present is usually quite low, the hydrocarbon mixture consisting mainly of paraffinic hydrocarbons. In still other cases, both saturated and unsaturated hydrocarbons may be present in substantial amounts. A typical example of this is Colombian Diesel oil.

It is to be understood then that by the present invention, the nitrated products may contain nitrated groups such as nitrites (—ONO) and nitrates (—ONO₂) in which carbon and nitrogen are separated by oxygen. In addition, nitrated groups such as the nitroso (—NO) and nitro (—NO₂) groups, in which carbon is attached directly to nitrogen, may also be present.

In many cases of nitration it is sometimes difficult to entirely eliminate oxidation. If the latter phenomenon occurs, then traces of nitrogen tetroxide (N₂O₄) or nitrogen trioxide (N₂O₃) may result. These oxides of nitrogen may then react with previously formed nitro compounds to give nitrolic acids (with primary nitro group to give

and pseudonitroles (with secondary nitro groups to give

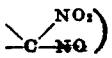

These latter materials may, if desired, be removed (by weak alkaline extraction, etc.), or they may be retained in the nitrated product for their insecticidal value.

By the term "nitrated product," then, is meant all products resulting by the action of nitric acid, or other suitable nitrating agent, on a petroleum hydrocarbon starting material, said petroleum hydrocarbon starting material containing any, several, or all of: olefinic, saturated aliphatic, naphthenic, aryl or aralkyl hydrocarbons.

As hereinbefore mentioned, the nitrated products may contain nitro groups acidic in character; for example, as when the starting hydrocarbon mixture is olefinic in nature, or as well when the starting material contains olefinic material along with saturated aliphatic, naphthenic, and aromatic hydrocarbons, or even when the olefinic and aromatic contents of the starting material are low and the paraffinic and naphthenic contents are high. When these acidic nitro groups are present, the tendency toward alkali solubility is imparted to the nitrated product, the extent of which tendency is governed by the weight of the nitrated molecule, the number of acidic nitro groups, and the influence of other groups. Said acidic nitro groups are advantageous for the preparation of insecticidal sprays insofar that said "nitrated products" tend to be more soluble in aqueous or weak alkaline solutions, have better wetting affinity for insect pests, are more compatible with aqueous soap solutions (e. g. 1:1000 potassium oleate solution, and the like), and are rendered less volatile and hence remain effective for longer periods. In some cases, however, it may be desirable to apply the insecticidal material in organic solution. This is easily accomplished by dissolving the nitrated product in any common organic solvent (e. g. alcohol, acetone, gasoline, kerosene, benzene, etc.), the presence of the groups of nitration often making the nitrated product more easily miscible with organic liquids.

In some cases, however, if desirable, the "nitrated product" may be further condensed with appropriate diazonium compounds to produce "nitrated hydrazones," which materials likewise possess strong insecticidal properties. This condensation may be accomplished by reacting the nitrated products, in the presence of alkaline materials (e. g. sodium hydroxide, potassium carbonate, and the like), with diazonium compounds. These diazonium compounds may be prepared (by treating organic amines with a mineral or other acid and a metallic nitrite, etc.) to produce simple or substituted nitro-hydrazones. By organic amine I mean any amine compound, naphthenic, aromatic or heterocyclic, which can be converted, by diazotization or other means, into a diazonium compound. Nitro-hydrazones thus formed may be used in any of several forms, as described hereinbefore, as insecticidal sprays and the like. This condensation may be illustrated by the following example:

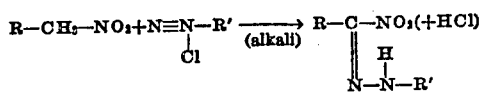

where R is a hydrocarbon residue which may also contain any other nitrated groups in addition to the nitro groups involved in the above-mentioned condensation with diazonium compounds; where R' is hydrocarbon or heterocyclic nucleus which may be unsubstituted or substituted, the latter of which group may comprise, if desired, acidic radicals (—SO₃H, —COOH, etc.) which would tend further to make the final product more easily soluble in dilute alkali or soap solutions.

The nitrated hydrazones possess a further advantage, as outlined by this invention, in that the former are true dyes, the nitro groups serving as "chromophores," while the

grouping present in nitro-hydrazones serves as "auxochrome." As is well known, dyes possess marked specificity and enhanced activity in regard to absorptive tendencies toward textile fibers and certain organisms and the like, and, therefore, the nitro-hydrazones would thus be expected to exert a similar effect toward insect organisms.

The first step in the treatment represented by this invention comprises mixing hydrocarbon starting materials with a nitrating agent (e. g. nitric acid of the appropriate strength) and efficiently agitating, with or without heat, as found desirable, for a suitable length of time. I have found that the nitric acid used may be either dilute (e. g. of specific gravity 1.09) or concentrated (specific gravity 1.42), depending upon the specific nature of the hydrocarbon material being nitrated. In general, the use of lower temperatures necessitates higher concentration of nitric acid and vice versa. Also, an increase in acid strength or reaction temperature usually results in a shortened reaction time. The nitration may be completed in one step or may be carried out in several successive steps, and the operations made batch or continuous. The nitrated product may be separated and refined (e. g. by washing thoroughly with water and drying or by neutralizing mineral acid with limestone, etc.). If desired, the nitrated portion may be separated from any unnitrated material (e. g. by distillation under vacuum or with the aid of steam, or by solvent extraction, for example, with aniline or alcoholic alkali, etc.). If desired the nitrated portions may be converted into nitrated hydrazones by treatment with alkali (e. g. sodium hydroxide in aqueous-alcoholic solution) and slowly adding this solution, while kept cool, to an aqueous or aqueous-alcoholic solution of a diazonium compound. The latter may be prepared by the methods hereinbefore mentioned and the parent substance may be an aromatic, or substituted aromatic amine (e. g. aniline, nitro-aniline, sulphanilic acid, and the like). The nitrated hydrazones thus formed may be recovered and refined by dilution with water, accompanied by possible acidification with dilute acid (depending upon the specific nature of nitrated hydrazone), followed by washing with water and drying.

I have found that the nitro-hydrazones described herein possessed the tendency to dissolve in aqueous mineral acids as well as in alkalies. This comes by virtue of the secondary amino grouping

possessed by these nitro-hydrazones. If desired, the nitro-hydrazones may be dissolved in mineral acids (e. g. strong hydrochloric acid) and greatly diluted with water, whereupon stable colloidal suspensions of the nitro-hydrazones or their salts result.

For application to insect-infested vegetation, the hereinbefore-described insecticidal materials may be dissolved in a volatile organic solvent, sprayed onto the insects, and the solvent allowed to evaporate. Or, if it is desirous to use aqueous spray preparations, the nitrated hydrocarbons or nitrated hydrazones may be added, as such, or thinned with a small amount of a solvent, to dilute soap solutions while the latter are being vigorously agitated by means of an efficient stirrer. If desired, this may be accomplished by the aid of heat. In some cases, in which the nitrated hydrocarbons or nitrated hydrazones contain acidic nitro groups, it may be necessary to add small amounts of alkali to their soap emulsions to render them more stable. In such a case alkali is added in amounts just sufficient to produce slight pink colors when tested with phenolphthalein.

My invention is illustrated by the following typical examples:

*Example 1.*—To 250 parts by volume of an olefinic material (a water-white mobile liquid of specific gravity 0.730, prepared by the co-polymerization of normal butylene and isobutylene and consisting principally of octenes) were added 125 parts by volume of nitric acid of specific gravity 1.20 (30–33 per cent $HNO_3$). The mixture was agitated and heated under reflux at 70° C. for 2 hours. At the end of this time the aqueous layer (spent acid) was withdrawn and replaced by a similar volume of fresh nitric acid of 1.20 specific gravity and the nitration treatment repeated. After five such treatments the specific gravity of the nitrated product (a yellow oil) had reached 1.115. This oil, after washing and drying over anhydrous sodium sulphate, was obtained in a yield of 210 parts by volume.

*Example 2.*—A solution (A) was prepared by dissolving 10 parts by weight of the nitrated co-dimer, as prepared in Example 1, 5 parts by weight of potassium hydroxide, and 30 parts by weight of water in 50 parts by weight of ethyl alcohol. A second solution (B) was prepared by adding slowly 4 parts by weight of sodium nitrite to a cold solution of 5 parts by weight of aniline and 17 parts by weight of 93 per cent sulphuric acid in 250 parts by weight of water, this being followed by the addition of 22.5 parts by weight of sodium acetate. While still cold (0° to +5° C.), solution (A) was added slowly, and with stirring, to solution (B). A deep red oil immediately separated. After standing for several hours the nitro-hydrazone material was recovered by extraction with ether. This solution was dried over anhydrous sodium sulphate, and the ether evaporated. The residue, a deep red oil, dissolved in alcohol, ether, acetone, benzene, gasoline, and heavy mineral oil. It was also found to be soluble in strong mineral acids, e. g. concentrated hydrochloric acid. On dilution of the hydrochloric acid solution of this nitro-hydrazone material, a stable colloidal suspension was obtained.

*Example 3.*—A sample of Pennsylvania Diesel oil, an almost colorless liquid of specific gravity 0.825 (consisting essentially of paraffinic hydrocarbons, with smaller proportions of olefinic and aromatic hydrocarbons, bromine number 0.0446; 0.0446 mg. bromine per mg. Pennsylvania oil), was nitrated in the following manner: One hundred parts by volume of this Pennsylvania oil and 20 parts by volume of nitric acid of specific gravity 1.42 (68–69 per cent $HNO_3$), were agitated at 25° C. for 8 hours. At the end of this time the oily layer was separated from the spent acid and a small amount (about 1–2 per cent) of sludge, washed thoroughly with water and dried over calcium chloride. The product, a yellow oil, possessed a specific gravity of 0.839.

*Example 4.*—A solution (A) was prepared by adding 41.9 parts by weight of the nitrated Pennsylvania oil from Example 3, 5 parts by weight of potassium hydroxide, and 50 parts by weight of water to 200 parts by weight of isopropyl alcohol. A second solution (B) was prepared by dissolving the following materials in 250 parts by weight of cold water in the order given: 17 parts by weight of 93 per cent sulphuric acid, 5 parts by weight of aniline, 4 parts by weight of sodium nitrite, and 22.5 parts by weight of sodium acetate. While both solutions were cold (0° to +5° C.), (A) was added slowly to (B). The red, oily nitro-hydrazone material separated and was recovered by extracting with ether and evaporating the latter.

*Example 5.*—A sample of Colombian Diesel oil of specific gravity 0.847, and which contained considerable unsaturated material (bromine number 0.276; 0.276 mg. bromine per mg. Colombian oil) along with aromatic and saturated aliphatic hydrocarbons, was nitrated in the following manner: One hundred parts by weight of this Colombian oil and 25 parts by weight of nitric acid of specific gravity 1.09 (15 per cent $HNO_3$) were agitated at 70° C. for 12 hours. The resulting oily layer was separated from the spent acid and a small amount (about 1 per cent) of sludge and washed thoroughly with water and dried. The dark-colored oily product possessed a specific gravity of 0.880.

*Example 6.*—A mixture (A) was prepared of the following constituents: Twenty-two parts by weight of the nitrated Colombian oil from Example 5, 2.5 parts by weight of potassium hydroxide, 25 parts by weight of water, and 120 parts by weight of ethyl alcohol. A second solution (B) was prepared by adding 2 parts by weight of sodium nitrite to a solution of 2.5 parts by weight of aniline in dilute sulphuric acid (containing 8.5 parts by weight of 93 per cent sulphuric acid and 200 parts by weight of water), followed by the addition of 11.25 parts by weight of sodium acetate. While both (A) and (B) were held at 0° to +5° C., the former was added slowly to the latter. A deep red nitro-hydrazone material separated which was recovered by ether extraction, followed by evaporation of the ether.

*Example 7.*—An emulsion was prepared by adding dropwise 2 parts by weight of nitro-hydrazones (from Example 2) dissolved in 3 parts by weight of ethyl alcohol, to a heated (70–80° C.) solution of 1 part by weight of ammonium oleate in 99 parts by weight of water, followed by cooling to room temperature.

*Example 8.*—Two climbing vines (English ivy) were sprayed with the nitro-hydrazone emulsion from Example 7. Each of the two plants was sprayed thoroughly seven times at regular intervals during a period of 28 days. Spraying consisted of allowing the atomized emulsion to impinge onto the foliage until all the upper surfaces were thoroughly wetted. No noticeable harmful effects were created by the above spraying.

*Example 9.*—Two peony plants were sprayed with the nitro-hydrazone emulsion prepared according to Example 7. Each plant was sprayed thoroughly seven times at regular intervals during a period of 28 days. The method of spraying was similar to that described in Example 8. No noticeable harmful effects were brought about by the above spraying.

*Example 10.*—Black chrysanthemum aphides were reared in the following manner: Two chrysanthemum bushes (about 2½ to 3 feet in height) were inoculated with black chrysanthemum aphides and the two bushes then covered with closely-woven cheesecloth tents stretched over wire frames. The latter of these were fitted over the bushes and held upright by protruding legs which were stuck into the ground. The cloth covers protected the insects in question from the deleterious effects of rain, wind, etc. After a few weeks the aphides had increased in number so rapidly that a single small twig (2–3 inches in length) carried one to two hundred of these insects.

*Example 11.*—Red spiders were reared by inoculating a golden glow plant with these insects and covering the plant by the means described in Example 10. This furnished an available means of procuring red spiders for insecticidal spray tests.

*Example 12.*—Emulsions of the nitrated co-dimer as obtained in Example 1 were prepared as follows: to 250 parts by weight of a 1:1000 potassium oleate solution were added slowly 2.5 parts by weight of nitrated co-dimer dissolved in 3 parts by weight of ethyl alcohol, the soap solution being heated to 80–90° C. This resulted in a yellow emulsion. Due to the presence of acidic nitrated groups, a more stable emulsion was obtained by adding a small amount of sodium hydroxide until the emulsion produced a slight pink with phenolphthalein. Due to some evaporation (alcohol and water) during the emulsification step, water was added to the emulsion to adjust its weight to 250 parts.

A more dilute emulsion, one of 1:250 strength of nitrated co-dimer in 1:1000 potassium oleate, was prepared by adding 150 parts by weight of 1:1000 potassium oleate solution to 100 parts by weight of the 1:100 emulsion of nitrated co-dimer prepared above.

A blank solution was prepared, in order to detect any possible effect of the small amount of alcohol present. This was prepared by adding 3 parts by weight of ethyl alcohol to 250 parts by weight of 1:1000 potassium oleate solution and heating and stirring in the manner described above.

*Example 13.*—The emulsions of Example 12 were used in spraying aphides reared according to Example 10 and red spiders reared according to Example 11. The tests were run as follows: Twigs were cut from the insect-infested plants of Example 9, and placed on a table consisting of a wooden framework with a closely woven cheesecloth top. Each twig was then sprayed from a height of 15 inches with 10 "bulbs" of air-emulsion mixture (Example 12), using a hand atomizer in a horizontal position with nozzle tip directed downward onto the twig. By "bulb" is meant the amount of air or insecticide carried by one squeeze of the hand bulb. The averages of many tests showed that a single squeeze of the bulb carried 47.8 cc. of spray vapor which consisted of 0.2 cc. of liquid insecticide solution in an atomized condition, the remainder or 47.6 cc. being air. The sprayed twigs were then covered with halves of 100 mm. diameter Petri dishes and allowed to stand for 24 hours, after which time the twigs were inspected and the insects individually examined and counted by means of tweezers and magnifying glass and classified as alive, dead or moribund.

Those insects moribund, for the sake of calculations, were considered as 50 per cent dead. In other words, for each two that were moribund, one was added to the list of dead. The results of the spray tests using the emulsions of Example 12 are as follows:

tests (as used in Example 13), employing black aphides and red spiders reared according to Examples 10 and 11, respectively. The results are tabulated below: For blank runs see Example 13.

| Petri No. | Insect | Spray | Conc. | Number insects used | After 24 hours ||| Percent killed |
|---|---|---|---|---|---|---|---|---|
| | | | | | Dead | Alive | Moribund | |
| 1 | Black chrysanthemum aphides | Nitrated Pennsylvania oil, Example 3 | 1:250 | 156 | 70 | 72 | 14 | 49.5 |
| 2 | do | do | 1:100 | 99 | 54 | 32 | 13 | 61.0 |
| 3 | Red spiders | do | 1:250 | 46 | 27 | 13 | 6 | 65.3 |
| 4 | do | do | 1:100 | 54 | 43 | 11 | 0 | 79.6 |

*Example 16.*—Emulsions were made using nitro-hydrazones from Pennsylvania oil as obtained in Example 4. These emulsions, of 1:100 and 1:250 strengths in 1:1000 potassium oleate solution, were prepared according to the method of Example 12. These were sprayed (according to Example 13) onto insects reared as described in Examples 10 and 11, respectively. The results are tabulated below. For blank runs see Example 13.

| Petri No. | Insect | Spray | Conc. | Number insects used | After 24 hours ||| Percent killed |
|---|---|---|---|---|---|---|---|---|
| | | | | | Dead | Alive | Moribund* | |
| 1 | Black chrysanthemum aphides | Water | | 143 | 9 | 134 | | 6.3 |
| 2 | do | do | | 184 | 7 | 177 | | 3.8 |
| 3 | do | K-oleate | 1:1000 | 123 | 18 | 105 | | 14.6 |
| 4 | do | do | 1:1000 | 89 | 10 | 79 | | 10.6 |
| 5 | do | Nitrated co-dimer Example 10 | 1:250 | 138 | 81 | 17 | 40 | 73.3 |
| 6 | do | do | 1:250 | 125 | 26 | 67 | 32 | 33.6 |
| 7 | do | do | 1:100 | 89 | 60 | 21 | 8 | 72.0 |
| 8 | do | do | 1:100 | 82 | 61 | 6 | 15 | 83.6 |
| 9 | Red spiders | Water | | 21 | 1 | 20 | | 4.75 |
| 10 | do | K-oleate | 1:1000 | 54 | 3 | 49 | 2 | 7.4 |
| 11 | do | Nitrated co-dimer Example 10 | 1:250 | 16 | 13 | 2 | 1 | 84.4 |
| 12 | do | do | 1:100 | 16 | 16 | | | 100.0 |

*Those insects which showed slight leg movement only when said legs were touched with tweezers were considered moribund.

*Example 14.*—Emulsions of 1:100 and 1:250 concentration in 1:1000 potassium oleate solution of the nitro-hydrazones as described in Example 2, were prepared according to the method of Example 12. The emulsions thus obtained were stable and of a brownish color. These emulsions were used in spray tests (as in Example 13) employing black aphides (Example 10) and red spiders (Example 11). The results follow: For blank runs see Example 13.

| Petri No. | Insect | Spray | Conc. | Number insects used | After 24 hours ||| Percent killed |
|---|---|---|---|---|---|---|---|---|
| | | | | | Dead | Alive | Moribund* | |
| 1 | Black chrysanthemum aphides | Nitrohydrazones from Pennsylvania oil, Example 4 | 1:250 | 225 | 96 | 115 | 14 | 45.8 |
| 2 | do | do | 1:100 | 102 | 84 | 7 | 11 | 88.0 |
| 3 | Red spiders | do | 1:250 | 95 | 36 | 57 | 2 | 39.0 |
| 4 | do | do | 1:100 | 66 | 50 | 8 | 8 | 81.8 |

*Example 17.*—The nitrated Colombian Diesel oil as prepared in Example 5 was converted into

| Petri No. | Insect | Spray | Conc. | Number insects used | After 24 hours ||| Percent killed |
|---|---|---|---|---|---|---|---|---|
| | | | | | Dead | Alive | Moribund | |
| 1 | Black chrysanthemum aphides | Nitrohydrazones of co-dimer (Example 2) | 1:250 | 85 | 27 | 55 | 3 | 33.6 |
| 2 | do | do | 1:250 | 138 | 20 | 113 | 5 | 16.3 |
| 3 | do | do | 1:100 | 150 | 134 | 1 | 15 | 94.5 |
| 4 | do | do | 1:100 | 88 | 82 | 3 | 3 | 94.9 |
| 5 | Red spiders | do | 1:250 | 15 | 15 | | | 100.0 |
| 6 | do | do | 1:100 | 19 | 19 | | | 100.0 |

*Example 15.*—Emulsions of nitrated Pennsylvania oil of Example 3 in 1:1000 potassium oleate solution were prepared by the emulsification procedure of Example 12. These light-colored emulsions were produced in concentrations of 1:100 and 1:250. They were used in spray emulsions of 1:100 and 1:250 concentrations, using potassium oleate solution of 1:1000 strength. The method of emulsification was that described in Example 12. These were sprayed, according to Example 13, onto insects reared by the methods of Examples 10 and 11, respectively.

The results follow. For blank runs see Example 13.

| Petri No. | Insect | Spray | Conc. | Number insects used | After 24 hours ||| Percent killed |
|---|---|---|---|---|---|---|---|---|
| | | | | | Dead | Alive | Moribund* | |
| 1 | Black chrysanthemum aphides. | Nitrated Colombian oil of Example 5. | 1:250 | 170 | 37 | 93 | 40 | 33.5 |
| 2 | ...do... | ...do... | 1:100 | 125 | 70 | 45 | 10 | 60.0 |
| 3 | Red spiders | ...do... | 1:250 | 23 | 10 | 5 | 8 | 60.8 |
| 4 | ...do... | ...do... | 1:100 | 35 | 22 | 6 | 7 | 73.0 |

*Example 18.*—The nitro-hydrazones obtained from Colombian oil as in Example 6 were converted into emulsions of 1:100 and 1:250 concentrations. Aqueous potassium oleate 1:1000 was used as the dispersing medium and the emulsions were prepared following the method as outlined in Example 12. Spray tests were made according to Example 13, using aphides (Example 10) and red spiders (Example 11). The tabulated results are shown below. For blank runs see Example 13.

| Petri No. | Insect | Spray | Conc. | Number insects used | After 24 hours ||| Percent killed |
|---|---|---|---|---|---|---|---|---|
| | | | | | Dead | Alive | Moribund* | |
| 1 | Black chrysanthemum aphides. | Nitrohydrazones from Colombian oil (Example 6). | 1:250 | 273 | 105 | 158 | 10 | 40.2 |
| 2 | ...do... | ...do... | 1:100 | 197 | 120 | 65 | 12 | 64.3 |
| 3 | Red spiders | ...do... | 1:250 | 90 | 61 | 25 | 4 | 70.0 |
| 4 | ...do... | ...do... | 1:100 | 52 | 35 | 12 | 5 | 72.0 |

It will be seen from the foregoing that my invention comprises treating hydrocarbon starting materials (olefinic, saturated paraffinic, naphthenic, or aryl or aralkyl in nature), derivable from petroleum, with a nitrating agent and separating the nitrated products and refining same, for example, by water-washing and drying. My invention further comprises the condensation of said nitrated hydrocarbons with diazonium compounds, and separating and refining the nitro-hydrazones thus obtained. My invention comprises further the use of said nitrated hydrocarbons and nitro-hydrazones as insecticidal materials, these insecticidal materials being applied either in aqueous-soap emulsions or in solution in organic solvents, or in colloidal clay suspensions, and the like.

What I claim is:

1. A horticultural contact insecticide consisting of nitrated olefins, said olefins derived from petroleum.
2. A contact insecticide which comprises nitro-hydrazones.
3. A contact insecticide which comprises nitro-hydrazones, said nitro-hydrazones being derived from nitrated petroleum distillates.
4. A contact insecticide which comprises nitro-hydrazones, said nitro-hydrazones being derived from nitrated olefins.
5. A contact insecticide which comprises nitro-hydrazones, said nitro-hydrazones being formed by the condensation of nitrated petroleum distillates with phenyldiazonium chloride.
6. A contact insecticide which comprises nitro-hydrazones, said nitro-hydrazones being formed by the condensation of nitrated olefins with phenyldiazonium chloride.

CARLETON ELLIS.